United States Patent

[11] 3,622,457

| [72] | Inventors | Emery W. Dennis<br>Albany;<br>David Rosi, East Greenbush, both of N.Y. |
|---|---|---|
| [21] | Appl. No. | 882,722 |
| [22] | Filed | Dec. 5, 1969 |
| [45] | Patented | Nov. 23, 1971 |
| [73] | Assignee | Sterling Drug Inc.<br>New York, N.Y. |
| [32] | Priority | Dec. 9, 1968 |
| [33] | | Great Britain |
| [31] | | 58,462/68 |

[54] PROCESS FOR PREPARING 5-(AMINOALKYLAMINO)-6 (OR 7)-HALO-8-QUINOLINE METHANOLS
4 Claims, No Drawings

[52] U.S. Cl. .................................................. 195/51 R, 260/287, 424/258
[51] Int. Cl. ........................................................ C12d 1/00
[50] Field of Search ............................................ 195/51

[56] References Cited
UNITED STATES PATENTS

| 3,312,598 | 4/1967 | Rosi et al. ................. | 195/51 R |
| 3,379,620 | 4/1968 | Archer et al. .............. | 195/51 R |

*Primary Examiner*—Alvin E. Tanenholtz
*Attorneys*—Elmer J. Lawson, B. Woodrow Wyatt, Thomas L. Johnson, Robert K. Bair, William G. Webb and Roger T. Wolfe

ABSTRACT: 5-(aminoalkylamino)-6(or 7)-halo-8-quinolinemethanols, having schistosomacidal activity, are prepared by subjecting the correspoonding 6(or 7)-halo-5-(aminoalkylamino)-8-methylquinoline to the fermentative enzymatic action of a micro-organism capable of effecting oxidation of the 8-methyl group to 8-hydroxymethyl, said micro-organism being of an order selected of the group consisting of Moniliales, Mucorales, Sphaeriaelses, Sphaeropsidales, Melanconiales and Actinomycetales.

PROCESS FOR PREPARING 5-(AMINOALKYLAMINO)-6 (OR 7)-HALO-8-QUINOLINE METHANOLS

PROCESS

This invention relates to a process for preparing 5-(aminoalkylamino)-6(or 7)-halo-8-quinolinemethanols.

The compounds produced by the process of our invention are 6(or 7)-halo-5-($R_1R_2N$—Y—NH)-8-quinoline methanols, where Y is polycarbon-lower-alkylene, $R_1$ is hydrogen, lower-alkyl or lower-2-hydroxyalkyl, $R_2$ is lower-alkyl or lower-2-hydroxyalkyl, and where $R_1$ and $R_2$ taken with N comprehends saturated N-heteromonocyclic radicals having five to seven ring atoms. Accordingly, these compounds are depicted as having halo attached to the 6- or 7-position and having aminoalkylamino of the formula $R_1R_2N$—Y—NH attached to the 5-position of 8-quinolinemethanols and lower-alkyl ethers and lower-alkanoyl esters thereof. These compounds when tested according to standard chemotherapeutic evaluation procedures have the inherent applied use characteristics of having schistosomacidal activity. The compounds, which are disclosed and claimed in copending application S. Archer and D. M. Bailey Ser. No. 690,795, filed Dec. 15, 1967, are useful as schistosomacidal agents for treatment of mammalian subjects.

The invention sought to be patented resides in the process for producing said 6(or 7)-halo-5-($R_1R_2N$—Y—NH)-8-quinolinemethanols which comprises subjecting the corresponding 6(or 7)-halo-5-($R_1R_2N$—Y—NH)-8-methylquinoline to the fermentative enzymatic action of a micro-organism capable of effecting oxidation of the 8-methyl group to 8-hydroxymethyl, said micro-organism being of an order selected of the group consisting of Moniliales, Mucorales, Sphaeriaeles, Sphaeropsidales, Melanconiales and Actinomycetales. Not all species and genera of organisms within these orders are effective in the process, but whether a given specific organism is effective can readily be determined by following the general screening procedure described hereinbelow. A particularly preferred micro-organism is *Aspergillus sclerotiorum*.

Without limiting the generality of the foregoing, illustrative and preferred 6(or 7)-halo-5-($R_1R_2N$—Y—NH)-8-quinolinemethanols produced by our process are those of formula I:

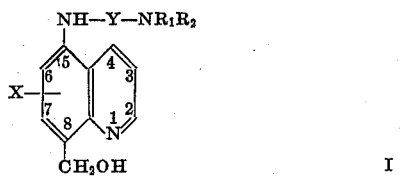

where X is halo, Y is polycarbon-lower-alkylene having from two to four carbon atoms and having its two connecting linkages on different carbon atoms, $R_1$ is hydrogen, lower-alkyl or lower-2-hydroxyalkyl and $R_2$ is lower-alkyl or lower-2-hydroxyalkyl, and where $R_1$ and $R_2$ taken with N, i.e., $NR_1R_2$, also comprehends saturated N-heteromonocyclic radicals having five to seven ring atoms, illustrated by piperidino, pyrrolidino, morpholino, piperazino, hexamethyleneimino and lower-alkylated derivatives thereof.

The term "lower-alkyl," as used herein, e.g., as one of the meanings for $R_1$ or $R_2$ in formula I, means alkyl radicals having from one to six carbon atoms, illustrated by methyl, ethyl, n-propyl isopropyl, n-butyl, 2-butyl, isobutyl, n-amyl, n-hexyl, and the like.

The term "halo," as used herein, e.g., as one of the meanings for X is formula I, means chloro, bromo, iodo or fluoro, with chloro being preferred because of the ready availability and cost advantages of chloro intermediates.

The term "lower-2-hydroxyalkyl," as used herein, e.g., as meanings for $R_1$ and $R_2$ in formula I, means hydroxyalkyl radicals having from two to six carbon atoms and having the hydroxy group attached to the carbon atom that is one carbon atom removed from the side chain nitrogen atom, illustrated by 2-hydroxyethyl, 2-hydroxypropyl, 2-hydroxy-2-methylpropyl, 2-hydroxybutyl, 2-hydroxy-2-methylbutyl, 2-hydroxy-2-ethyl-propyl, 2-hydroxyhexyl and the like.

The term "polycarbon-lower-alkylene," as used herein, e.g., as represented by Y in formula I, means alkylene radicals having from two to four carbon atoms and having its connecting linkages on different carbon atoms, illustrated by

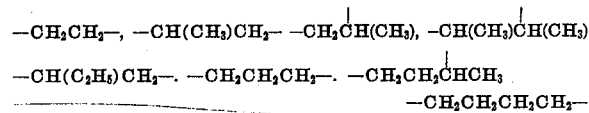

and the like.

When $NR_1R_2$ of formula I comprehends (lower-alkylated)-N-heteromonocyclic radicals, lower-alkyl radicals can be attached to any available ring atom and can vary preferably from one to three in number, e.g., 2-methylpiperidino, 3-ethylpiperidino, 4-methylpiperidino, 2,6-dimethylpiperidino, 2,4-dimethylpiperidino, 2,4,6-trimethylpiperidino, 3-n-propylpiperidino, 2,2-dimethylpiperidino, 2-methylpyrrolidino, 2,5-dimethylpyrrolidino, 2,3-dimethylmorpholino, 2-ethylmorpholino, 2-methylhexamethyleneimino, 2,7-dimethylhexamethyleneimino, 4-methylpiperazino, 3-ethylpiperazino, 2,4,6-trimethypiperazino, and the like.

The Y—NH)--(or 7)-halo-5-($R_1R_2N$—Y—NH)-8-quinolinemethanols produced by our process are useful in the free base form or in the form of their acid-addition salts. The acid-addition salts are simply a more convenient form for use; and, in practice, use of the salt form inherently amounts to use of the base form. The acids which can be used to prepare the acid-addition salts are preferably those which produce, when combined with the free base, chemotherapeutically acceptable salts, that is, salts whose anions are relatively innocuous to the animal organism in chemotherapeutic doses of the salts, so that the beneficial properties inherent in the free base are not vitiated by side effects ascribable to the anions; in other words, the latter do not substantially affect the chemotherapeutic properties inherent in the cations. Appropriate chemotherapeutically acceptably salts are those derived from mineral acids such as hydrochloric acid, hydrobromic acid, hydriodic acid, nitric acid, phosphoric acid, sulfamic acid, and sulfuric acid; and organic acids such as acetic acid, citric acid, tartaric acid, lactic acid, methanesulfonic acid, ethanesulfonic acid, benzenesulfonic acid, p-toluenesulfonic acid, quinic acid, 3-hydroxy-2-naphthoic acid, pamoic acid (2,2'-dihydroxy-1,1'-dinaphthylmethane-3,3'-dicarboxylic acid), naponic acid (1,4-naphthalenedisulfonic acid), and the like, giving the hydrochloride, hydrobromide, hydriodide, nitrate, phosphate, sulfamate, sulfate, acetate, citrate, tartrate, lactate, methanesulfonate, ethanesulfonate, benzenesulfonate, p-toluenesulfonate, quinate, 3-hydroxy-2-naphthoate, pamoate and naponate, respectively.

The acid-addition salts are prepared preferably by reacting the free base and acid in an organic solvent, e.g., ethanol, acetone, etc., in which case the salt separates directly or can be obtained by concentration of the solution.

The molecular structures of the 6(or 7)-halo-5-($R_1R_2N$—Y—NH)-8-quinolinemethanols produced by our process are assigned on the basis of evidence provided by infrared (IR), ultraviolet (u.v.) and nuclear magnetic resonance (NMR) spectra, by chromatograph mobilities, and, by the correspondence of calculated and found values for the elementary analyses for representative examples.

GENERAL SCREENING PROCEDURE

An illustrative general screening procedure used to evaluate the ability of micro-organisms to transform 6(or 7)-halo-5-($R_1R_2N$—Y—NH)-8-methylquinolines to the corresponding 6(or 7)-halo-5-($R_1R_2N$—Y—NH)-8-quinolinemethanols is described as follows: Micro-organisms to be screened are inoculated onto Sabovraud's agar slants or other agar base media suitable for growth. The inoculated slants are then placed in a 25° C. incubator and allowed to grow for 1 week. After one week's growth, the slant is removed and 15 ml. of sterile distilled water is added to it, and the spores and vegetative growth are loosened from the agar with a sterile needle. This suspension is then transferred to a flask containing 100 ml. of soy-dextrose medium of the composition:

| | |
|---|---|
| Soybean meal | 5 g. |
| Dextrose | 20 g. |
| NaCl | 5 g. |
| $K_2HPO_4$ | 5 g. |
| Yeast | 5 g. |
| Tap water 1 liter | | pH to 6.4.
Autoclave at 15 lbs. per sq. in. for 15 min.

The flask is then placed on a rotary shaker located in a 25° C. incubator and agitated at about 240–260 r.p.m. for 24 hours. After this initial time period (first stage seed), 5 ml. of the submerged growth is added to duplicate flasks (250 ml.) containing the above-noted soy-dextrose medium. These flasks are placed in the shaker and allowed to grow from 48 to 72 hours at 25° C. after which 5 mg. of substrate [a 6(or 7)-halo-5-($R_1R_2N$—Y—NH)-8-methylquinoline] dissolved in minimum amount of water, water-ethanol, dimethylformamide, acetone or methanol is added to one of the pair of flasks. The other flask receives only the solvent and serves as the control. These flasks are then agitated under the same conditions for an additional 24 hours before they are removed from the shaker. Growth characteristics and pH are noted, and to the whole beer of each flask is added 2 volumes of methylene dichloride. The flasks are then agitated at 200 r.p.m. for two 1-minute intervals. The heavier methylene dichloride extract is then siphoned off and the solvent removed by warming in a water bath at about 60° C. Then each residue is dissolved in 1 ml. of methylene dichloride for application to thin-layer plate for chromatographic analysis (described hereinbelow).

The nature of the material produced can be detected by thin-layer chromatography, and the 8-hydroxymethylquinoline (same as 8-quinolinemethanol) and the corresponding intermediate 8-methylquinoline (if not completely converted) isolated by column chromatography on conventional adsorbents such as silica gel or alumina.

The screening samples were all chromatographed on silica gel thin-layer plate (T.L.C.) using a suitable system, a preferred one consisting of 9 volumes of ethyl acetate and 1 volume of triethylamine. The 8-hydroxymethylquinoline compound appears as a less mobile (more polar) component than the intermediate 8-methylquinoline compound in said preferred chromatographic system. The silica gel containing the more polar components is removed and each component is eluted with absolute methanol and the eluates subjected to ultraviolet (u.v.) spectral analysis.

Large batch fermentations and procedures for isolating sufficient quantities of 8-hydroxymethylquinolines for elementary analyses and schistosomicidal studies in specific examples hereinbelow will further illustrate aspects of our invention without, however, limiting it thereto.

The above-described general screening procedure and the batch fermentations given below in the specific examples are illustrative and can be varied in different ways: by using other micro-organisms whose fermentative enzymatic action is capable of effecting the oxidation of said 8-methylquinolines to the corresponding 8-hydroxymethylquinolines; by using other nitrogen sources in place of soybean meal, e.g., cornmeal, oatmeal, milk protein hydrolysates, other protein hydrolysates, corn steep liquor, meat extract, etc.; by using other carbon sources in place of dextrose, e.g., sucrose, glucose, maltose, starch, molasses, etc., by varying the time of addition of the substrate after addition of the medium from 0 to 72 hours; by varying the initial pH from about 5.0 to about 8.0, preferably between 6.5 and 7.5; by varying the quantity of substrate; by varying the rate of stirring; and, by utilizing other modifications known in the fermentative art.

Conversion of 6-chloro-5-(2-diethylaminoethylamino)-8-methylquinoline to 6-chloro-5-(2-diethylaminoethylamino)-8-quinolinemethanol was carried out as follows: 6-chloro-5-(2-diethylaminoethylamino)-8-methylquinoline as its hydrochloride was first subjected to the fermentative action of *Aspergillus sclerotiorum* (SWRI $A_{24}$, available at Sterling-Winthrop Research Institute, Rensselaer, N.Y.) using the above screening procedure. There was thus produced a more polar product, i.e., 6-chloro-5(2-diethylaminoethylamino)-8-quinolinemethanol, with concomitant loss of starting material as evidenced by thin-layer chromatography. This screening was carried out as follows: *Aspergillus sclerotiorum* (SWRI $A_{24}$) was grown in a soy-dextrose medium (50 ml. in 250 ml. Erlenmeyer flasks) for 24 hours on a rotary shaker 240 r.p.m. Next, 10 mg. of 6-chloro-5-(2-diethylaminoethylamino)-8-methylquinoline hydrochloride was added to one flask while a second flask served as a control. After 72 hours the contents of each flask was made alkaline by addition of aqueous sodium hydroxide solution and was extracted with dichloromethane. The respective residues after removal of the dichloromethane in vacuo were each dissolved in 1.0 ml. of methylene dichloride and 25 µl. of each was spotted on a T.L.C. plate containing silica gel. The plate was developed in the system of 9 volumes of ethyl acetate and 1 volume of triethylamine. A more polar component ($R_f$=0.42) than the starting 6-chloro-5-(2-diethylaminoethylamino)-8-methylquinoline ($R_f$=0.56) was observed from the contents of the experimental flask which was not present in the control. The new component had a similar u.v. spectrum in methanol to that of the starting material, i.e., $\lambda^{max}$=252 mµ.

To obtain sufficient material for isolation and characterization of the more polar product, a 14 liter fermentor was set up as follows:

| | |
|---|---|
| $MgSO_4\cdot 7H_2O$ | 2.25 g. |
| Soybean meal | 135 g. |
| Yeast | 45 g. |
| NaCl | 45 g. |
| $K_2HPO_4$ | 135 g. |
| Antifoam (e.g., UCON-LB 625) | 14 ml. |

Tap water 7.8 liters, pH adjusted to 6.4 with 10 N HCl prior to autoclaving for 45 minutes at 121° C. Dextrose, 200 g., in 500 ml. water was autoclaved separately and added to above sterile medium. The contents of the above fermentor were cooled to 30° C. and were then inoculated with a 700 ml. culture of *Aspergillus sclerotiorum* (SWRI $A_{24}$) which had been incubated for 48 hours at 26° C. on a rotary shaker at 240 r.p.m. The inoculated fermentor was agitated at 450 r.p.m. and aerated at a level of 4 liters of air per minute at 30° C. After 24 hours, 2 g. of 6-chloro-5-(2-diethylaminoethylamino)-8-methylquinoline hydrochloride dissolved in 200 ml. of sterile water was added. After an additional 31 hours, 200 g. of dextrose in 500 ml. of sterile water plus 1 g. of 6-chloro-5-(2-diethylaminoethylamino)-8-methylquinoline hydrochloride dissolved in 100 ml. of sterile water was added. Then 119 hours after the addition of the first portion of the substrate, the fermentation was terminated by adding 150 ml. of 10 N aqueous sodium hydroxide solution and the mixture was extracted twice with 20 liter portions of dichloromethane. The extracts were combined and concentrated under reduced pressure to yield an oily residue which was dissolved in 150 ml. of methanol containing 10 ml. of water. This solution was extracted with two 100 ml. portions of n-hexane which removed a waxy material and some unaltered 6-chloro-5-(2-diethylaminoethylamino)-8-methylquinoline. The methanol phase was filtered and to the filtrate was added 10 ml. of 0.1 N aqueous sodium hydroxide solution. The resulting solution was concentrated in vacuo to a volume of about 50 ml. To this concentrated solution was added 100 ml. of 0.02 N aqueous sodium hydroxide solution and the mixture was extracted with four 200 ml. portions of methylene dichloride. The combined methylene dichloride extracts were dried over anhydrous sodium sulfate, filtered and the filtrate concentrated in vacuo to remove the solvent and to yield an oily residue. Sufficient methylene dichloride was added to the oily residue to bring the total volume to 13 ml. and 1 ml. of this material was applied as a thin band to each of 13 silica gel preparative plates, 20×40 cm., 1 mm. thickness.

The plates were developed using the solvent medium composed of 8 volumes of n-hexane and 1 volume each of chloroform and isopropylamine. The areas of each plate containing the desired conversion product, i.e., 6-chloro-5-(2-diethylaminoethylamino)-8-quinolinemethanol, were removed, combined and thoroughly mixed with 400 ml. of chloroform containing 2 percent isopropylamine. The slurry was filtered first using filter paper; the filtrate was then concentrated in vacuo to a volume of about 50 ml.; and, the concentrate was then filtered through a ultrafine porosity fritted disc. The remaining solvent was removed in vacuo and the residue was dried over phosphorus pentoxide in vacuo at 40° C. for 18 hours to yield 1.066 g. of 6-chloro-5-(2-diethylaminoethylamino)-8-quinolinemethanol. The NMR, IR and u.v. spectra of this product confirmed its assigned structure. A 0.9 g. portion of the above 6-chloro-5(2-diethylaminoethylamino)-8-quinolinemethanol, an oil, was dissolved in 25 ml. of ethanol in a 50 ml. centrifuge tube and 10 ml. of 0.9 N ethanolic hydrogen chloride whereupon a yellow crystalline precipitate formed. The tube was centrifuged at 2,000 r.p.m. and the supernatant liquid decanted. The crystalline product was suspended in ether and filtered to yield 0.855 g. of 6-chloro-5-(2-diethylaminoethylamino)-8-quinolinemethanol dihydrochloride, m.p. 149–152° C., which was found to have an elementary analysis and IR spectrum consistent with its assigned structure.

Using the foregoing general screening procedure and the batch fermentative procedure, other 6(or 7)-halo-5-($R_1R_2N$—Y—NH)-8-methylquinolines are converted to the corresponding 6(or 7)-halo-5-($R_1R_2N$—Y—NH)-8-quinolinemethanols. The intermediate 6(or 7)-halo-5-($R_1R_2N$—Y—NH)-8-methylquinolines are prepared by reduction of the 6(or 7)-halo-8-methyl-5-nitroquinolines to form the corresponding 5-amino-6(or 7)-halo-8-methylquinolines and then reacting the latter with an aminoalkyl halide of the formula $R_1R_2N$—Y—X' where $R_1$, $R_2$ and Y have the meanings given hereinabove and X' is halide, preferably chloride, bromide or iodide. The preparation of the intermediate 6(or 7)-halo-5-($R_1R_2N$—Y—NH)-8-methylquinolines is illustrated by the following preparation of 6-chloro-5-(2-diethylaminoethylamino)-8-methylquinoline: A mixture of 15 g. of 6-chloro-8-methyl-5-nitroquinoline, 194 ml. of water, 5.62 ml. of concentrated hydrochloric acid and 1 g. of 7 percent palladium chloride-on-carbon was hydrogenated in a Parr apparatus at 25° C. using an initial hydrogen pressure of 50 p.s.i. When hydrogen consumption ceased, the reaction mixture was filtered and the solid was washed water. The combined aqueous filtrate and wash was made basic with 10 percent aqueous potassium carbonate solution and the oil thus liberated was taken up in chloroform. The chloroform solution was washed successively with water and brine, was dried over anhydrous magnesium sulfate and heated in vacuo to remove the chloroform and to yield 10 g. of an oil. The oil was triturated with boiling cyclohexane and the cyclohexane soluble material was crystallized by cooling the cyclohexane solution. The solid was recrystallized from ethanol-water to yield 5-amino-6-chloro-8-methylquinoline, m.p. 108°–113° C.

A solution of 10.0 g. of 5-amino-6-chloro-8-methylquinoline in 100 ml. of dimethylformamide was added dropwise to a stirred suspension of 1.25 g. of sodium hydride in 100 ml. of dimethylformamide. The reaction mixture was maintained at 75° C. during the addition and briefly thereafter until the evolution of hydrogen ceased; it was then cooled to 25° C. To the mixture was added dropwise with stirring over a 30 minute period a solution of 21.6 g. of 2-diethylaminoethyl chloride in 100 ml. of dimethylformamide and the resulting reaction mixture was stirred at 25° C. for an additional 4½ hours. A few ml. of water was then added dropwise and the resulting mixture filtered. The solid was washed with chloroform and discarded. The combined filtrate and chloroform wash was stripped to remove most of the volatile materials. The residue was dissolved in ether and the ether solution was washed thoroughly with water and then with brine. The washed solution was dried over anhydrous magnesium sulfate and concentrated in vacuo to remove the solvent, thereby leaving a residual brown oil weighing 11.8 g. A 6.3 g. portion of said oil was purified by dissolving it in 75 ml. of ethyl acetate and shaking this solution with 75 ml. of a buffer solution of pH 3 (prepared by dissolving 67.5 g. of sodium acetate trihydrate in 500 ml. of water and adding sufficient concentrated hydrochloric acid to give a pH of 3). The aqueous layer was made slightly basic using 10 percent sodium hydroxide solution and was extracted with ethyl acetate. The extract was dried over anhydrous magnesium sulfate and concentrated in vacuo to remove the ethyl acetate and to yield 3.2 g. of oily product, i.e., 6-chloro-5-(2-diethylaminoethylamino)-8-methylquinoline. A solution of this product in benzene was treated with one molar equivalent of methanolic hydrogen chloride, the solution concentrated in vacuo and the concentrate cooled. The resulting crystalline precipitate was collected and recrystallized from isopropyl acetate containing a small quantity of isopropyl alcohol to yield 6-chloro-5-(2-diethylaminoethylamino)-8-methylquinoline monohydrochloride, m.p. 164°–165° C. The elemental analyses and NMR spectrum of this compound is consistent with its assigned structure.

Other 6(or 7)-halo-5-($R_1R_2N$—Y—NH)-8-methylquinolines prepared by the above-described two-step procedure starting with the corresponding 6(or 7)-halo-8methyl-5-nitroquinoline and using in the second step the appropriate aminoalkyl halide of the formula $R_1R_2N$—Y—X' are the following: 6-bromo-5-(2-diethylaminoethylamino)-8-methylquinoline, 5-(2-diethylaminoethylamino)-6-iodo-8-methylquinoline, 5-(2-diethylaminoethylamino)-6-fluoro-8-methylquinoline, 7-chloro-5-(2-diethylaminoethylamino)-8-methylquinoline, 7-bromo-5-(2-diethylaminoethylamino)-8-methylquinoline, 5-(2-diethylaminoethylamino)-7-iodo-8-methylquinoline, 6-chloro-5-(4-dimethylaminobutylamino)-8-methylquinoline, 6-chloro-5-(2-diemthylamino-1-propylamino)-8-methylquinoline, 6-chloro-8-methyl-5-(2-piperidinoethylamino)quinoline, 6-chloro-8-methyl-5-[2-(2,5-dimethylpyrrolidino)ethylamino]quinoline, 6-chloro-5-(2-diethylaminopropylamino)-8-methylquinoline, 6-chloro-5-[2-di-(n-butyl)aminoethylamino]-8-methylquinoline, 6-chloro-8-methyl-5-(2-n-propylaminoethylamino)quinoline, 6-chloro-5-{2-[N-ethyl-N-(2-hydroxyethyl)amino]ethylamino}-8-methylquinoline, 6-chloro-5-[2-(2-hydroxyethylamino)ethylamino]-8-methylquinoline, 6-chloro-5-{2-[N,N-bis(2-hydroxyethyl)amino]-ethylamino}-8-methylquinoline, 6-chloro-5-{2-[N-methyl-N-(2-hydroxy-2-methylpropyl)amino]ethylamino}-8-methylquinoline, 6-chloro-8-methyl-5-(2-piperidinoethylamino)quinoline, 6-chloro-8-methyl-5-[2-(2-methylpiperidino)ethylamino]quinoline, 6-chloro-8-methyl-5-(2-pyrrolidinoethylamino)quinoline, 6-chloro-8-methyl-5(2-morpholinoethylamino)quinoline, 6-chloro-5-(2-hexamethyleneiminoethylamino)-8methylquinoline, and, 6-chloro-8-methyl-5-[2-(4-methylpiperazino)ethylamino]-quinoline. The corresponding 6(or 7)-halo-5-($R_1R_2N$—Y—NH)-8-quinolinemethanols are obtained from the foregoing corresponding 8-methylquinolines using the latter as substrates in the above general screening procedures and batch fermentative procedures.

Also, the foregoing general screening procedure and batch fermentative procedure can be carried out to convert said 6(or 7)-halo-5-($R_1R_2$N—Y—NH)-8-methylquinolines to the corresponding 6(or 7)-halo-5-($R_1R_2$N—Y—NH)-8-quinolinemethanols using in place of *Aspergillus sclerotiorum* other micro-organisms of the orders Moniliales, Mucorales, Sphaeriaeles, Sphaeropsidales, Melanconiales and Actinomycetales.

The 6(or 7)-halo-5-($R_1R_2$N—Y—NH)-8-quinolinemethanols produced by the process of our invention when administered orally to hamsters and Swiss mice infected with *Schistosoma mansoni* were found to clear the animals of the parasitic infection at dose levels of compound in the range of 0.5 to 100 mg. per kg. of body weight per day for 5 consecutive days.

The actual determination of the numerical schistosomacidal data definitive for a particular compound is readily obtained by standard test procedures, referred to above, by technicians versed in chemotherapeutic test procedures, without any need for any extensive experimentation.

The 5-(aminoalkylamino)-6-(or 7)-halo-8-quinolinemethanols produced by the process of the invention can be prepared for use by conventional pharmaceutical procedures: that is, by dissolving or suspending them in a pharmaceutically acceptable vehicle, e.g., aqueous alcohol, glycol, oil solution, or oil-water emulsion, for parenteral or oral administration; or by incorporating them in unit dosage form as tablets or capsules for oral administration either alone or in combination with conventional adjuvants, e.g., calcium carbonate, starch, lactose, talc, magnesium stearate, gum acacia, and the like.

The subject matter which the applicants regard as their invention is particularly pointed out and distinctly claimed as follows:

1. The process of producing a 6(or 7)-halo-5-($R_1R_2$N—Y—NH)-8-quinolinemethanol, where Y is polycarbon-lower-alkylene, $R_1$ is hydrogen, lower-alkyl or lower-2-hydroxyalkyl, $R_2$ is lower-alkyl or lower-2-hydroxyalkyl, or, $R_1$ and $R_2$ taken with N comprehend a saturated N-heteromonocyclic radical having from five to seven ring atoms, which comprises subjecting the corresponding 6(or 7)-halo-5-($R_1R_2$N—Y—NH)-8-methylquinoline to the fermentative enzymatic action of a micro-organism capable of effecting oxidation of the 8-methyl group to 8-hydroxymethyl, said organism being of an order selected from the group consisting of Moniliales, Mucorales, Sphaeriaeles, Sphaeropsidales, Melanconiales or Actinomycetales.

2. The process according to claim 1 wherein 6-halo-5-(2-diethylaminoethylamino)-8-quinolinemethanol is obtained from 6-halo-5-(2-diethylaminoethylamino(-8-methylquinoline.

3. The process according to claim 1 wherein the micro-organism belong to the genus Aspergillus.

4. The process according to claim 1 wherein the micro-organism is *Aspergillus sclerotiorum*.

* * * * *

UNITED STATES PATENT OFFICE
CERTIFICATE OF CORRECTION

Patent No. 3,622,457  Dated November 23, 1971

Inventor(s) Dennis and Rosi

It is certified that error appears in the above-identified patent and that said Letters Patent are hereby corrected as shown below:

Title page, line 3 of the Abstract, "correspoonding" should read -- corresponding --.

Title page, line 8 of the Abstract, "Sphaeriaelses" should read -- Sphaeriaeles --.

Column 1, between the title and line 5, omit "PROCESS".

Column 1, line 70, between "propyl" and "isopropyl" insert a comma.

Column 2, line 15, insert a comma after "-CH(CH$_3$)CH$_2$-".

Column 2, line 32, "The Y-NH)--(or 7)" should read -- The 6-(or 7) --.

Column 3, line 8, "Sabovraud's" should read -- Sabouraud's --

Column 5, line 62, between "washed" and "water" insert -- with --.

Column 6, line 50, "diemthylamino" should read -- dimethylamino --.

Column 8, line 21, "(-8-" should read -- )-8- --.

Column 8, line 24, "belong" should read -- belongs --.

Signed and sealed this 10th day of April 1973.

SEAL)
Attest:

EDWARD M. FLETCHER, JR.
Attesting Officer

ROBERT GOTTSCHALK
Commissioner of Patents